United States Patent [19]

Onsrud

[11] 4,033,230
[45] July 5, 1977

[54] PROFILE CUTTING MACHINE

[76] Inventor: Rudolph F. Onsrud, 456 W. Frontage Road, Northfield, Ill. 60093

[22] Filed: July 2, 1973

[21] Appl. No.: 375,664

[52] U.S. Cl. .............................. 90/13.4; 90/11 A; 90/13.6; 90/13.9; 90/19; 51/101 R
[51] Int. Cl.² ....................... B23C 1/18; B23C 5/26
[58] Field of Search ................. 90/13.6, 13.1, 13.3, 90/18, 13.4, 19, 13.2, 13.7, 13.9, 11 A, 17; 51/101 R, 101 LG

[56] References Cited

UNITED STATES PATENTS

| 1,724,741 | 8/1929 | Woodward | 90/18 X |
| 2,356,571 | 8/1944 | Dewoitine | 90/13 |
| 2,366,247 | 1/1945 | Fauser | 90/13.9 |
| 2,702,495 | 2/1955 | Creek | 90/11 |
| 2,844,074 | 7/1958 | Meyer | 90/13.4 |
| 3,224,340 | 12/1965 | Wahlstrom | 90/13.7 |

Primary Examiner—Othell M. Simpson
Assistant Examiner—Z. R. Bilinsky
Attorney, Agent, or Firm—Neuman, Williams, Anderson & Olson

[57] ABSTRACT

A rotary profile cutting machine is provided which includes supports for the workpiece and the cutting tool wherein a workpiece can be moved into the bite of the rotating tool. The cutting tool is supported at opposite ends by a spindle means so as to minimize torsional and bending loads on the tool.

8 Claims, 8 Drawing Figures

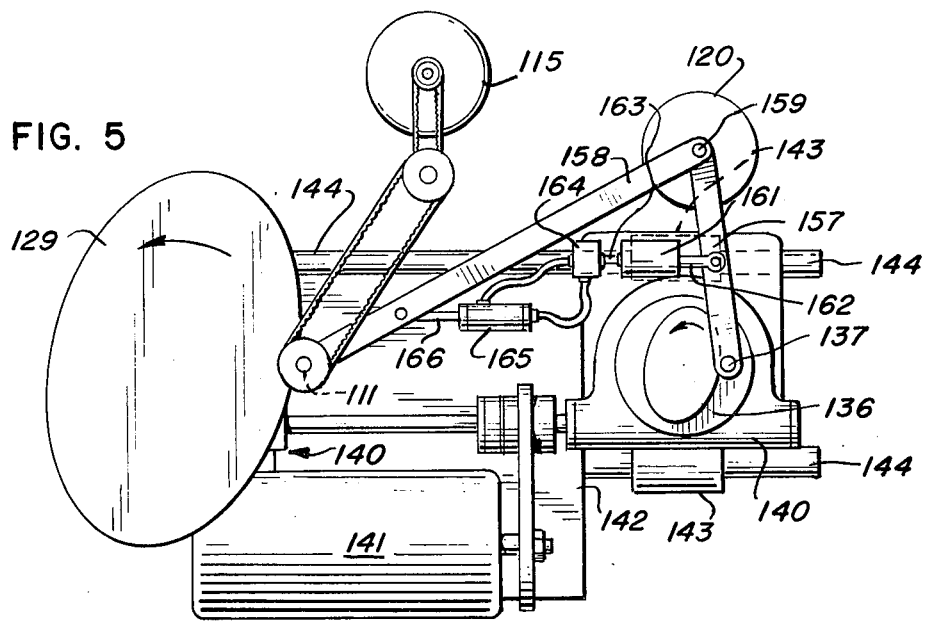
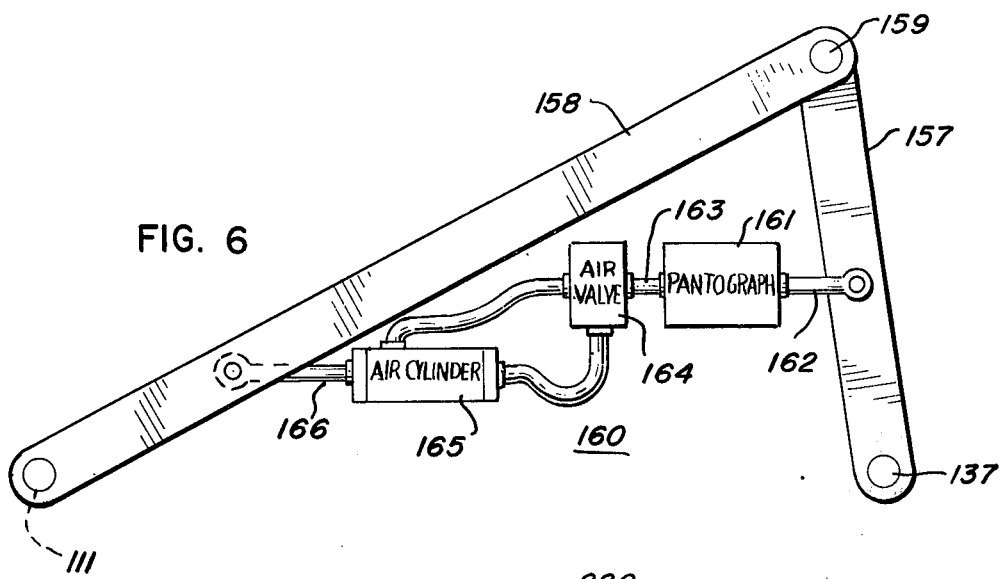
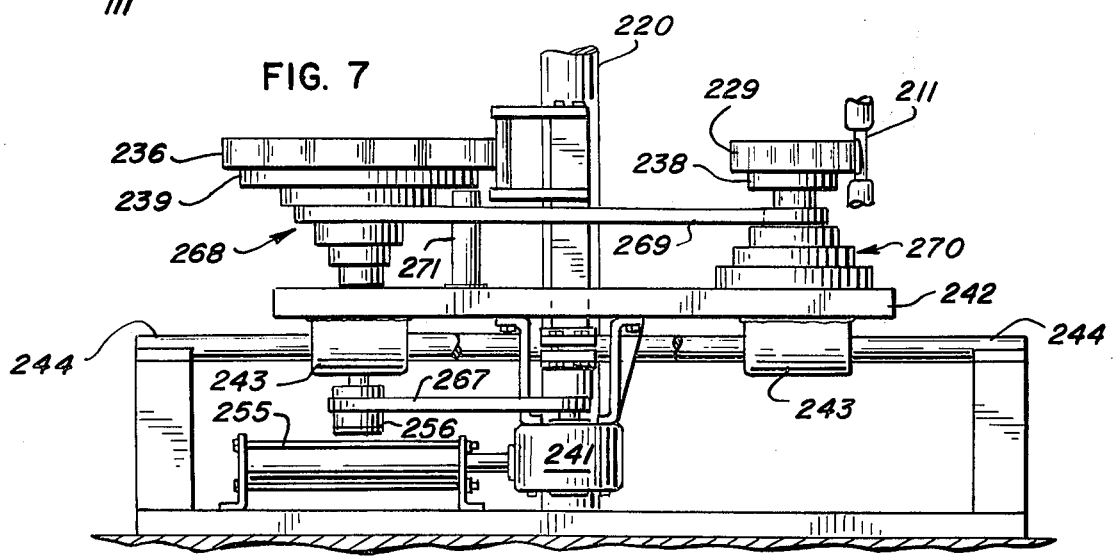

PROFILE CUTTING MACHINE

BACKGROUND OF THE INVENTION

In the field of profile shaping wherein rotary cutters are used to shape or contour the edge of a workpiece according to a desired pattern, hand routers are generally used particularly on individual jobs not requiring large quantities of repetitive work. Routing machines normally consist of a high speed motor generally of the series wound electrical type to which is coupled a side milling tool and in addition such machines include a simple guide mechanism for adjusting the depth of tool cut in the plane formed by the cutter's axis and a line normal to the direction of cutter travel. The router cutters usually include a number of ridges defined by flutes to provide clearance for removal of cut material. Because router cutters are moved along or across the workpiece rather than through or into as a drill would be moved, the cutting ridges and clearance flutes are not of the spiral twist type found in drills or other mills. Consequently, in a router the removal of chips or cut material is mostly radial or tangential such that bending loads are imposed on the tool because the chips are unable to leave the worked surface quickly enough. When chips bog down between the cutter and the worked surface the resulting force is transmitted to the cutter tool and its support. In a hand tool such forces are generally minimal because the size of the machine limits the amount of force which can be applied, the amount of material which can be removed during one pass, and the hardness of the material to be cut.

The invention herein uses the cutting principles and techniques of a routing machine, but is adapted to remove much greater quantities of harder materials in much shorter periods of time. That is to say, the machine is designed for repetitive production which must be as fast and as accurate as possible in order to produce a finished part which will fit its companion pieces, will have a high quality finish, and will cost as little as possible. As is well known in the art, such hand routing devices can be mounted and arranged such that the workpiece may be moved into the cutter according to a camming pattern. Production machines of the above-mentioned type are designed so that the drive motors and cutting tools are much heavier in order that the loads imposed by high speed cutting will not destroy the tool or machine. The amount of work performed by production profilers is substantially greater.

Torsion is another form of loading which is imposed upon router cutting tools as a result of the nature of profile cutting. More specifically, each cutter ridge is literally scraping, conventional milling, tearing, or broaching the edge of the workpiece and tangential forces are imposed upon the cutting edges. These tangential forces result in great torsional stress about the axis of the cutter tool. The effect of such torsional loading or the torque reaction is greatest at the part of the tool farthest from the holder or cutter support, and so the cutter has a tendency to be twisted against the direction of cutter rotation. This reaction or loading is different from the loading of a drill with its spiral cutter flutes which generate axial forces as well.

As can be appreciated from the nature of the production techniques that require cutting or profiling much thicker workpieces, and/or shaping harder materials at much greater cutting rate, and/or removing substantial amounts of material and producing a very smooth and accurate reproduction of the pattern, the machine and cutting tool must be as close to rigid as possible. Any bending, chipping or breaking of the cutting tool could result in machine down time and in the production of many parts which are unsatisfactory in terms of shape, finish and quality before the problem was noted and corrected.

SUMMARY OF THE INVENTION

The invention disclosed herein seeks to overcome the problem of tool breakage by means of supporting the cutting tool above and below the workpiece. The cutter is designed to be chucked or colletted at opposite ends such that the cutting portion is supported therebetween. Consequently, the result is that the cantilever mounting of ordinary cutters is avoided and replaced with a simple beam loading. Preliminary experiments with an apparatus of the type disclosed show a twelvefold increase in tool life. Because improvements in tool life are a function of the workpiece thickness, feed function rate, depth or cut and hardness the workpiece material, predicting the exact amount by which cutter tool longevity will increase, is not possible. Suffice it to say that a cutter mounted on opposite ends will last longer and perform better because it will deflect less than a cutter with a cantilever mounting.

Having the concept for mounting the cutter in order to minimize the stress involved is not the complete solution because such cutters, when held as previously mentioned, in a high speed production machine must also include a table for support and movement of the workpiece. The table must be rigid enough to operate smoothly without vibration when the workpiece is brought into the bite of the cutter tool. While it is most convenient to hold the cutter in a fixed position and move the workpiece into the cutter in accordance with a prescribed pattern, certain configurations are most easily duplicated when the cutter is also moved with respect to the workpiece. Under such circumstances a pivotal mounting is a convenient and accurate way to support the cutter such that the axis of the cutter may be arcuately moved into greater engagement with the workpiece. A pantograph type mechanism may also be used to control the worktable or the tool such that the pattern may be magnified or minified. Because of the additional complexity involved in a profiler with the double mounting for the cutter, it is more desirable to fix the cutter and move the workpiece. Although it is possible to simultaneously move both the cutter and the workpiece towards each other, and for some patterns it is desirable to do so, the great majority of profiling may be performed by moving the workpiece in a locus which passes in front of the cutter while simultaneously moving the cutter into or out of engagement with the workpiece.

More specifically, the pattern may be duplicated by a follower mounted in the same relation to the pattern as is the cutter to the workpiece. That is to say, when using a rigidly mounted cutting tool and follower, the pattern and the workpiece should follow a compound motion into and across the cutter and follower, respectively. A convenient way in which to support and move the workpiece and the pattern is by means of a pair of rotatable tables which slide upon ball bushings such that the tables may be rotated in order to simultaneously drive the workpiece across the cutter and the follower across the pattern while the workpiece slides on the ball bushings into or out of engagement with the cutter tool as prescribed by the follower and directed by an actuating air cylinder. Ordinarily, the worktable and follower table may be geared or belt driven to rotate at the same rate. An advantage which flows from this arrangement and which is not available in the previously described techniques is that a unitary generated pattern may be used to form a corresponding pattern repeatedly by gearing the workpiece table to revolve at a greater rate than the pattern table.

It is an object of this invention to provide a fast, accurate and economical machine tool for profile cutting.

It is another object of this invention to mount a profile cutter such that little or no deflection results from cutting forces imposed on the cutter and thus, the finished workpiece has a surface with a high quality finish.

It is a further object of this invention to mount a profile cutter such that normal bending and torsional loads are minimized thus reduce the incidents of breakage.

It is still a further object of this invention to provide a movable worktable for supporting the workpiece and for moving the workpiece into the cutter in accordance with the corresponding movements of a pattern against a follower.

It is yet another object of this invention to include an interchangeable gearing means for moving the pattern against the follower at speeds which may be varied relative to the speed of movement of the cutter against the workpiece.

It is yet a further object of this invention to include a pivotal support for the cutter spindles and the follower such that the cutting time may be shortened.

The additional objects and advantages of the present invention will become apparent as the following description proceeds and the features of novelty which characterize this invention are pointed out with particularity in the claims annexed to and forming a part of this specification.

DESCRIPTION OF THE DRAWINGS

FIG. 5 is a schematic fragmentary top plan view of a modified form of the machine showing the cutter control system thereof which allows magnifying or minifying the pattern reproduction;

FIG. 6 is an enlarged schematic view of the pantograph, air valve and air cylinder mechanism which is included in the control system shown in FIG. 5, and FIG. 7 is a fragmentary schematic front elevational view of a second modified form of the machine showing the worktable and pattern table thereof and their various components.

FIG. 1 shows one form of the improved cutting tool machine 10 which rotates a profile cutter 11, releasably held by a pair of spindles 12 and 13 for holding respectively, the upper and lower ends of the cutter 11. The releasable support for the cutter 11 may be of a well known type of upper and lower collets or chucks 14. In order to drive upper spindle 12 and lower spindle 13 at the same speed there is a common source of rotary power which includes motor 15 for driving countershaft 16 by means of a typical multiple belt and pulley system 17. The countershaft 16 is journalled by a pair of pillow blocks and associated bearings 18 and 19 which support in spaced parallel relationship the countershaft 16 near its upper and lower ends, respectively to spindles 12 and 13. Pillow bearings 18 and 19 are mounted to a common support pillar 20 which acts as the main support for the entire machine. Countershaft 16 drives an upper cog pulley 21 and a lower cog pulley 22, which in turn drive cog belts 23 and 24, respectively. Upper spindle 12 includes an upper spindle cog pulley 25, and lower spindle 13 includes a lower spindle cog pulley 26. Driven cog pulleys 25 and 26 are identical to one another in size and tooth number, and similarly, drive cog pulleys 21 and 22 are identical to one another in size and tooth number. Cog belts 23 and 24 are driven by cog pulleys 21 and 22 such that spindle cog pulleys 25 and 26 rotate in the same direction and at the same velocity. There is an upper spindle support column 27 and a lower support spindle column 28 adjustably attached to pillar 20, in a fashion which is well known in the art, such that adjustments may be made to the vertical position and spacing between the spindles. It should be appreciated from the foregoing description of the machine 10 that its purpose is to simultaneously support and drive the cutter 11 at its opposite ends.

FIG. 2a illustrates the effect of the improvement of this machine 10 with its multiple drive and support arrangement. Cutter 11 shown as it is profiling or shaping the workpiece 29. Arrows have been included in FIGS. 2a and 2b to illustrate the motion and forces applied to and resulting in cutter 11. Arrow 30 in FIG. 2a illustrates the direction in which the cutter 11 moves with respect to the workpiece 29. For simplification and clarity, the arrow is shown as moving the cutter 11. In fact, the cutter 11 and the workpiece 29 could be made to move with respect to one another as will be explained later in connection with an alternative embodiment of this machine. Arrow 31 shows the direction of rotation of the cutter 11 during the profiling of the workpiece 29. Arrow 32 is illustrative of the force which results between the cutter tip 11a and the workpiece because of the engagement of the cutter 11 as it rotates and translates. Arrow 33 shows the torque reaction which results within the shank of the cutter 11 because of the cutting forces at the cutting tip 11a. FIG. 2b shows the forces which cause bending. Movement of the workpiece 29 generates a force represented by arrow 34 and which is resisted by cutter spindles 12 and 13. Arrows 35 illustrate the forces at the spindles. The resulting bending moment about the spindles 12 and 13 cause deflection of cutter 11.

Because the cutter 11 must be of a hard material, deflection in torsion and bending must be kept to a minimum to prevent breakage. From the foregoing, it is apparent that the forces which occur in the cutter 11 as the result of cutting through the workpiece 29, have a tendency to twist and bend cutter 11 away from engagement with the workpiece 29. Because of the upper and lower mounting of the cutter 11, the distance from any point at which the cutter 11 is supported to the area where the loading occurs is an absolute minimum, and in this way the deflection of the cutter 11 torsionally, or in bending, is approximately one-half of what it would be if the cutter 11 were supported only at one end. While it is well known to support cutters at both ends for bending loads, such is not the case for enlongated cutters which also have torsional loading.

Figure 1:
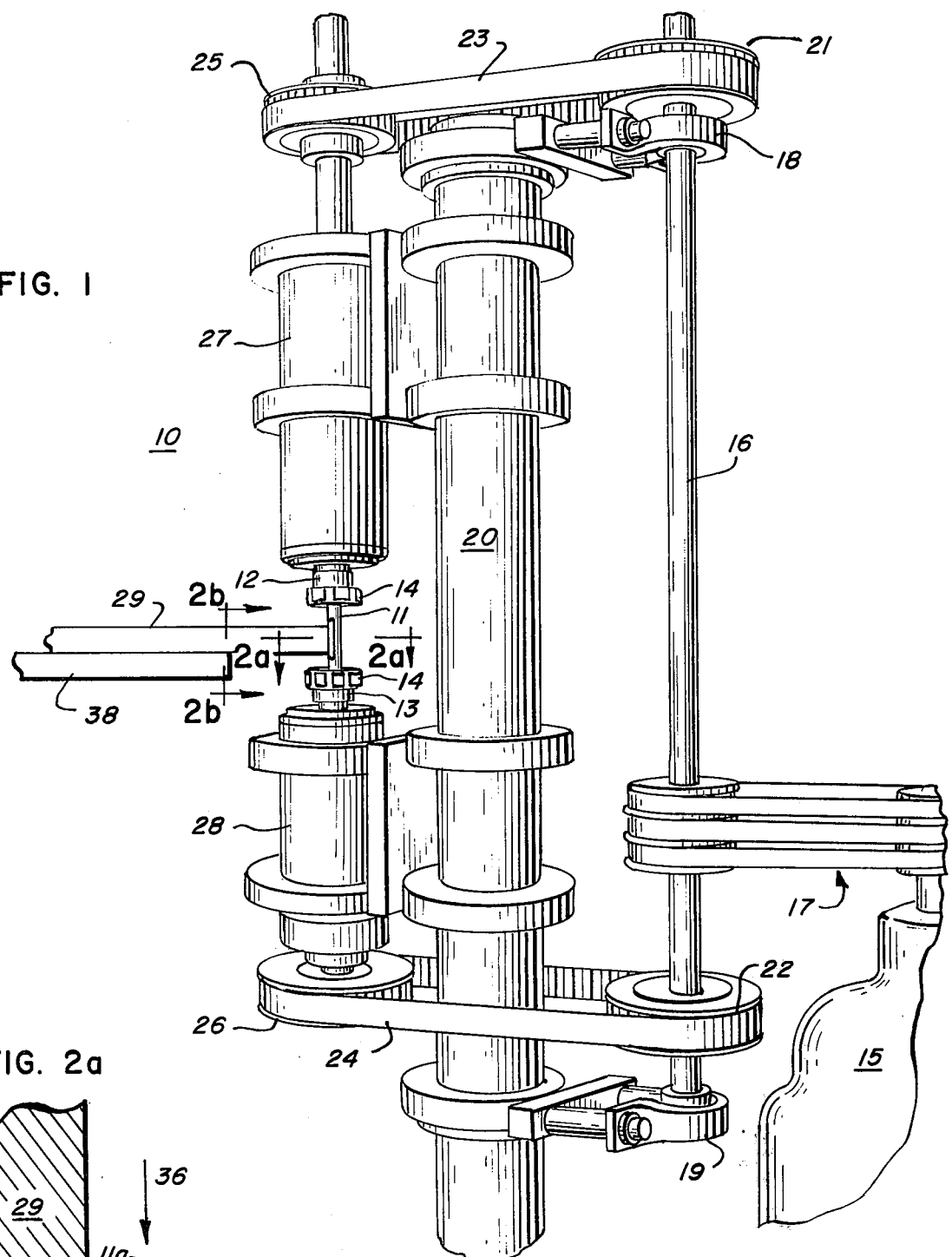
FIG. 1 is a fragmentary perspective view showing the motor, drive system, spindles and cutting tool of one form of the improved machine.
Figure 2A:
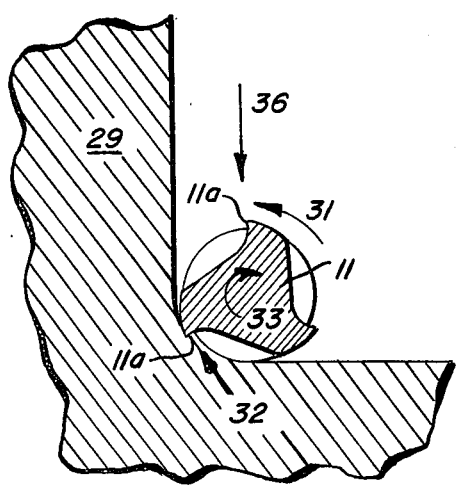
FIG. 2a is a fragmentary cross-sectional view taken along line 2A—2a of FIG. 1.
Figure 2B:
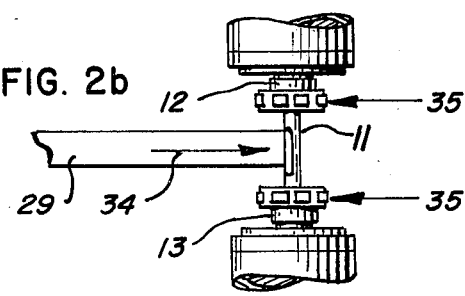
FIG. 2b is a fragmentary view taken along lines 2B—2b of FIG. 1.
Figure 3:
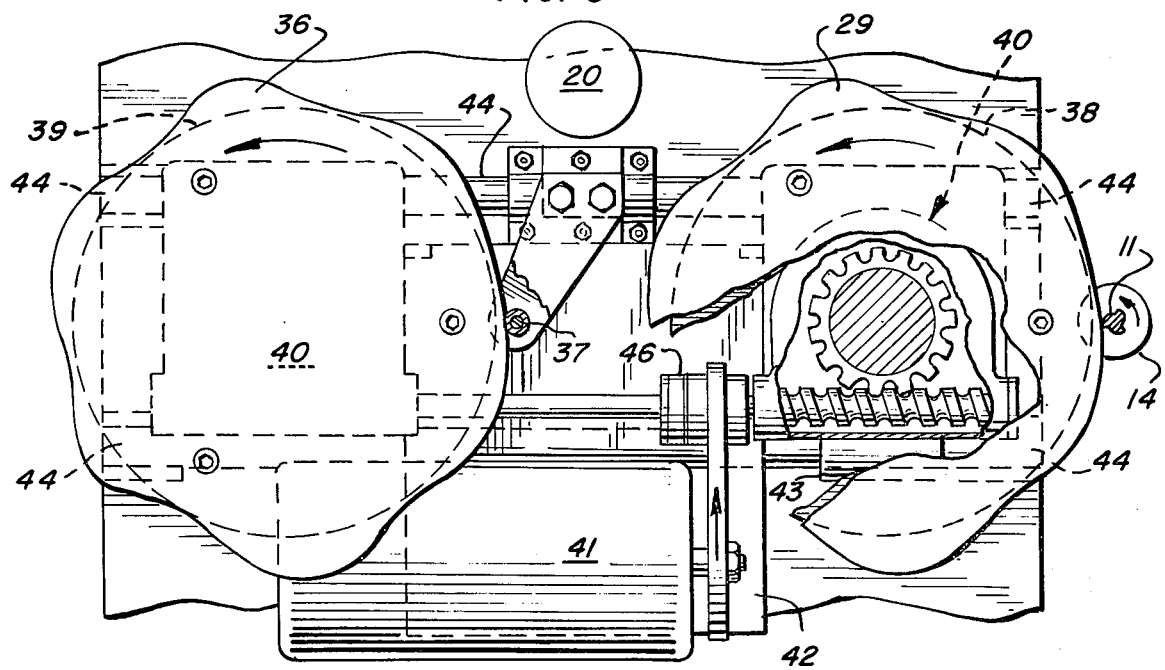
FIG. 3 is a fragmentary schematic top plan view of the cutting tool, workpiece and pattern tables and the drive therefor with portions being removed for purposes of illustrative clarity.
Figure 4:
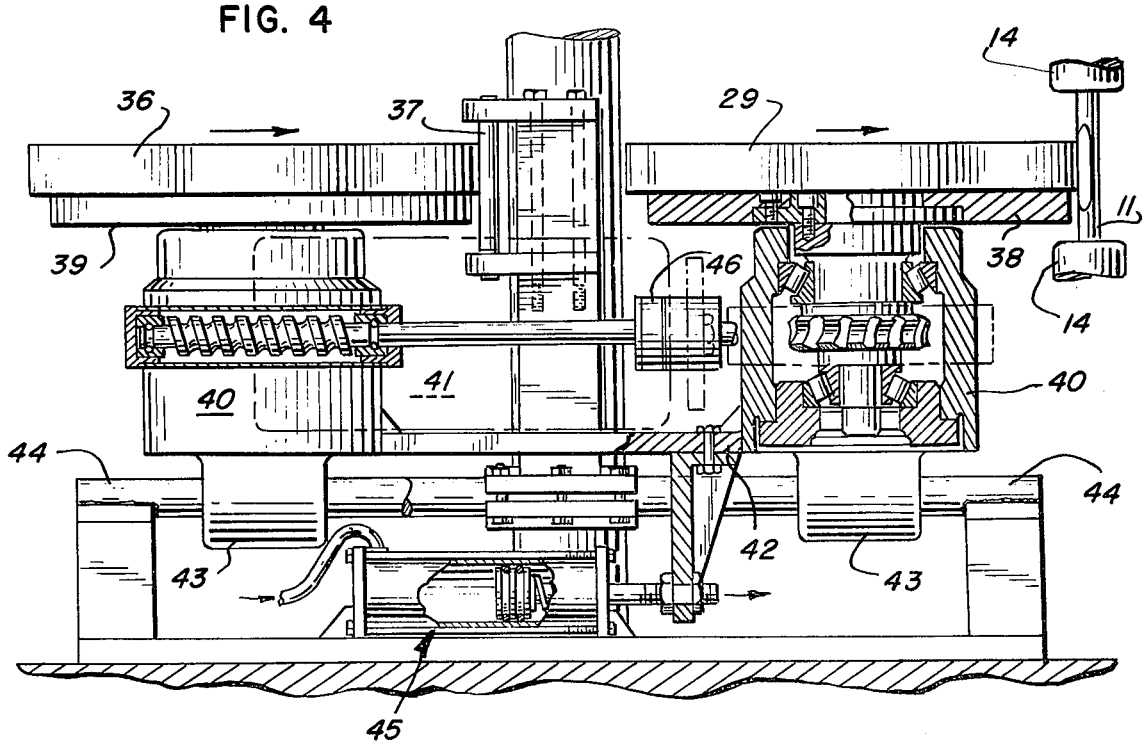
FIG. 4 is a fragmentary front elevational view of the drive for the tables with portions removed for the illustration of the particular features.

The firm mounting of the cutter 11 must be complemented by an equally firm support for the workpiece 29. In order that the workpiece 29 may be firmly held and moved such that it is cut or profiled as desired, a device which can transfer the shape from a pattern 36 to the workpiece 29 is necessary. FIGS. 3 and 4 show one form of such a device. The pattern 36 and the workpiece 29 are mounted in line with one another and in the same relationship to the cutter 11, and a pattern follower 37. The pattern 36 and workpiece 29 rotate against and across follower 37 and cutter 11, respectively, at the same relative distance from the center of rotation of pattern 36 and workpiece 29. The rotation of pattern 36 and workpiece 29 occurs because each is mounted upon a complementary rotary table 38 and 39, respectively. These tables are rotatably driven by worm gear transmissions 40, which are best shown in FIGS. 3 and 4. The tables 38 and 39 and the transmissions 40, are driven by a drive motor 41 which is mounted to a common chassis 42 which supports not only the motor 41, but also the transmissions 40. Chassis 42 has four ball bushings 43, two of which are shown in FIG. 4. These ball bushings glide along rods 44, supported upon pillar 20, such that the table transmissions 40, the tables 38 and 39 and the table drive motor 41 move as a unit toward or away from the follower 37 and the cutter 11. The follower 37 is supported in a fixed position off of one of the rods 44, such that it does not move, and so that it is in alignment with the cutter 11. Air cylinder and spring 45 connected to the chassis 42 moves the entire unit such that the pattern 36 is kept in constant contact with the follower 37 as the pattern table 39 rotates, and similarly the workpiece 29 engages the bite of cutter 11 as work table 38 is rotated by its transmission 40. For set up purposes there is a clutch 46 which enables the workpiece table 38 to be rotated independently of the pattern table 39. Since the transmissions 40 and the clutch 46 are a known type, the details of their description are not included.

An alternate form 110 of the same machine 10 is shown in FIG. 5. The difference is in the way the cutter 11 is operated relative to its follower. The advantage of this difference allows the use of a smaller or larger pattern 136 in order to generate a larger or smaller finished part 129. Since a number of the components of this alternate embodiment are identical to those previously described, they will not be explained other than to say that they are given reference numbers which correspond to the previous numbering but are in the 100 series. There are some pivotal links which are used to move the follower 137 and the cutter 11. The pivotal links which are best shown in FIGS. 5 and 6, are follower link 157 and cutter link 158, both pivoted about pivot point 159.

In order that the motion generated by the follower 137 bearing against the pattern 136 may properly control the position of the cutter 11, there is a control system generally designated 160 and shown schematically in FIG. 6. This system includes a pantograph 161, a well known linkage, that can be arranged to either magnify or minify the input motion of link 157. The pantograph 161 is connected to follower link 157 by an input rod 162. An output rod 163 moves an air valve 164 for controlling the amount of air for either side of air cylinder 165. The air valve 164 is of a well known type and is supplied with compressed air from a source not shown, such that the control motions from output rod 163 cause air valve 164 to feed air to a side of air cylinder 165. The air cylinder 165 is connected to cutter link 158 by means of another control rod 166. Consequently, the motion which is sensed by the follower 137 and transmitted to the follower link 157 may be suitably modified and transmitted to the cutter link 158 and the cutter 111. Although this arrangement does not require for its operation that the transmissions 140 and motor 141 be slidably mounted by means or ball bushings 143 on rods 144, it has been found that certain patterns require not only the compound motion of the rotating work and follower tables in conjunction with the arcuate movement of the cutter 111 and follower 137, but also the sliding motion previously described for the chassis 142. In particular, certain patterns have curves with an angle of attack which would tend to jam the machine. In such circumstances, a sliding chassis 142 would be desirable.

FIG. 7 shows a third embodiment 210 for this machine 10. Again, a number of the components of this embodiment are identical to those previously described and will not be explained other than to say that they are given corresponding reference numbers in the 200 series. There is a pattern table 239 and a workpiece table 238 mounted on a chassis 242 and arranged so that they are slidable by means of ball bushings 243 activated by an air cylinder 255. The table 239 is driven by a motor 241 by means of a belt and pulley system 267. A set up clutch 256 is connected between the pulley system 267 and the table 239. A stack of driven cog pulleys 268 having increased diameters and tooth numbers is mounted to the table 239 and rotates therewith. Cog belt 269 connects the drive pulleys 268 to a complementary stack of cog pulleys 270 arranged, in a well known manner, to provide a variety of speed ratios between the workpiece table 238 and the pattern table 239. An idler 271 is rotatably mounted on chassis 242, tensions the belt 269 during use and relaxes the belt 269 to facilitate a ratio changing.

From the foregoing it should be apparent that the pattern 236 must be a generating pattern having a different shape than the workpiece 229 to be formed because work table 238 will be rotating at a different speed than pattern table 239. That is to say, if work table 238 is rotating three times as fast as pattern table 239, then every bump or flute in the edge of pattern 236 will appear three times on workpiece 229, and in addition, the resulting shape of each bump or flute on workpiece 229 will be a function of the shape of the surface contours of the pattern 236. Consequently, a simplified pattern 236 may be used to generate a complexed workpiece 229.

While there has been shown and described various embodiments of the present invention, it will be apparent to those skilled in the art that further changes and modifications may be made without departing from the invention in its broader aspects, and it is, therefore, contemplated in the appended claims to cover all such changes and modifications as fall within the true spirit and scope of the present invention.

I claim:

1. A profile cutting machine comprising a slender cylindrically shaped axially extending elongated double-ended high speed cutting tool having a centrally located cutting portion, said tool being rotatable about said axis, chucking portions at opposite ends of said cutting portion, the length of said tool being substantially greater than any lateral dimension thereof and the lateral dimension of said tool being substantially uniform throughout said cutting portion; axially aligned and rotatably mounted chuck members releasably holding said tool chucking portions and overcoming dynamic cutting loads imposed on the tool during oblique and cross cutting through the full thickness of a workpiece when the latter is moved laterally of the rotary axis of said tool; drive means simultaneously rotating at high speed said chuck members and said cutting tool about said axis at the same angular velocity for overcoming rhythmic and cyclic torsional and bending loads imposed upon said tool during cutting of the workpiece; a workpiece support mounted for movement in a plane disposed transversely to said axis of rotation for engaging a workpiece between said chuck members for intersecting the central cutting portion of said tool thereby, said workpiece support including a planar work engaging surface oriented transversely to said axis of rotation; and a chassis supporting said chuck members, said drive means and said workpiece support in a predetermined relation for allowing the material cut from the workpiece to fall away from said cutting tool while the workpiece moves past the central portion of said cutting tool.

2. The machine of claim 1 wherein said high speed drive means includes a motor, shaft means rotatably supported on said chassis and drivingly connected to said motor by a high speed belt system, power take-off means including high speed cog belts interconnecting said shaft means and said chuck members.

3. The machine of claim 2 wherein said power take-off means includes first high speed cog belt drivingly connecting said shafts means and one of said chuck members, and a second high speed cog belt drivingly connecting said shaft means and the other of said chuck members wherein the axis of said shaft means and the rotary axis of said chuck members are in spaced substantially parallel relation.

4. The machine of claim 3 wherein said movable workpiece support includes a pair of movable tables coupled to move in unison with one another, one of said tables for supporting and holding the workpiece and the second of said tables for supporting and holding a pattern, said movable tables being rotatably driven for shaping the profile of the workpiece to the contour of the pattern, a cutting depth adjusting means for selectively positioning the cutting tool relative to the rotary axis of said one table.

5. The machine of claim 4 wherein said cutting depth adjusting means includes a first arm carrying said spindle means and pivotally mounted on said chassis and adapted to vary the space between the cutting tool held by said spindle means and the rotary axis of said one table, a follower for tracing the periphery of the pattern supported and held on said second table, a second arm carrying said follower and pivotally mounted on said chassis and adapted to vary the space beween the follower and the rotary axis of said second table, the rotary axes of said arms being coaxial and a pantograph interconnecting said arms.

6. The machine of claim 4 wherein said cutting depth adjusting means includes a slidable mounting on said chassis for said tables to effect transverse movement thereof relative to the rotary axis of said spindle means; said mounting having an elongated shaft fixedly mounted on said chassis and disposed transversely of the rotary axis of said spindle means, and shaft slide means mounted on said tables and movable therewith, said slide means being movable as a unit along said shaft.

7. The machine of claim 9 including a follower mounted on said chassis in spaced relation to the pattern support axis; the spacing between said follower and said pattern support table axis being the same as the spacing between the spindle means axis and the workpiece support table axis, air cylinder means mounted on said chassis and operatively connected to said support tables to effect relative movement thereof with respect to said follower and the axis of said spindle means, and means for rotating said tables.

8. The machine of claim 7 wherein said table rotating means includes a first drive unit connected to said workpiece support table and second drive unit connected to said pattern support table rotational speed-varying means operatively connected to said drive units to effect selective speed variations of said first drive unit, and clutch means mounted on one of said drive units.

* * * * *

UNITED STATES PATENT AND TRADEMARK OFFICE
CERTIFICATE OF CORRECTION

PATENT NO. : 4,033,230
DATED : July 5, 1977
INVENTOR(S) : Rudolf F. Onsrud

It is certified that error appears in the above-identified patent and that said Letters Patent are hereby corrected as shown below:

Column 2, line 21, after "feed" delete "function"

line 21, after "hardness" insert -- of -- line 24, "on" should be -- at --

Column 3, line 46, "2A-2a" should be -- 2a-2a -- line 48, "2B-2b" should be -- 2b-2b --

Column 4, line 37, after "Cutter 11" insert -- is --

Column 5, line 7, "enlongated" should be -- elongated -- line 59, "cutter 11" should be -- cutter 111 --

Column 6, line 16, "or" should be -- of --

Column 8, line 30, claim 7, change "claim 9" to -- claim 6 --

Signed and Sealed this

Eleventh Day of October 1977

[SEAL]

Attest:

RUTH C. MASON
Attesting Officer

LUTRELLE F. PARKER
Acting Commissioner of Patents and Trademarks